W. S. MORTON.
TRACTOR.
APPLICATION FILED OCT. 30, 1915.
1,371,641.
Patented Mar. 15, 1921.
2 SHEETS—SHEET 1.
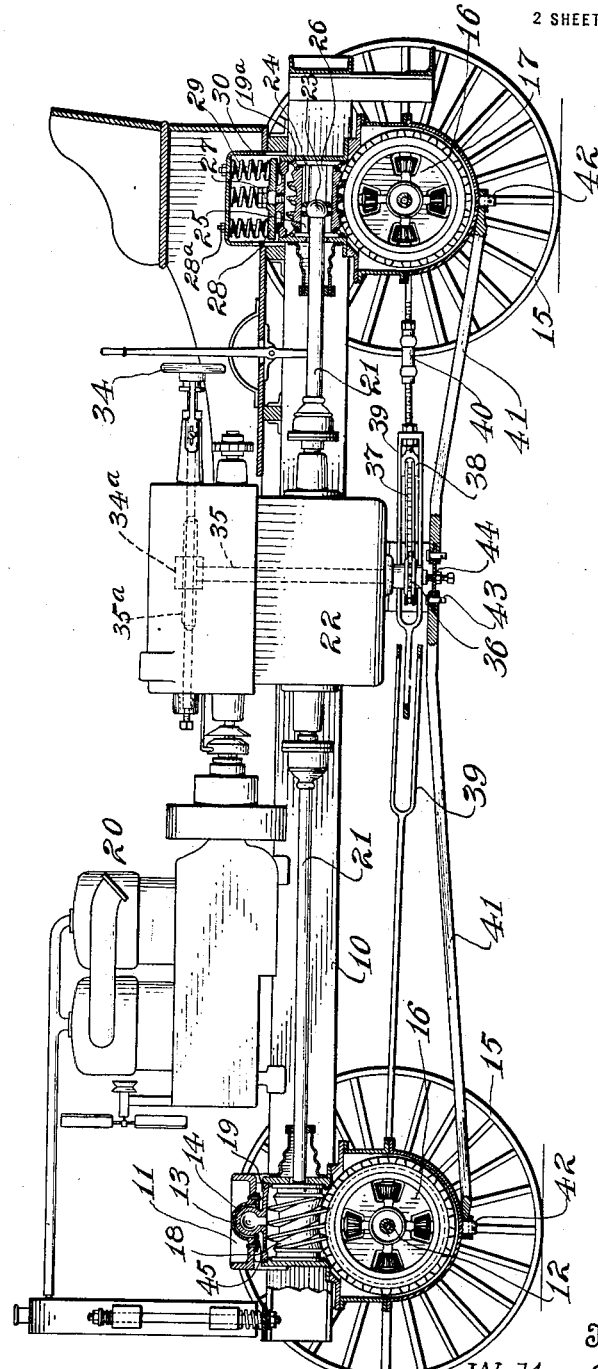
Fig. 1.
Fig. 5.
Witnesses:
Wm H Hawkins
F. W. Ammen
Inventor
Walter S. Morton
By his Attorneys

W. S. MORTON.
TRACTOR.
APPLICATION FILED OCT. 30, 1915.
1,371,641.
Patented Mar. 15, 1921.
2 SHEETS—SHEET 2.
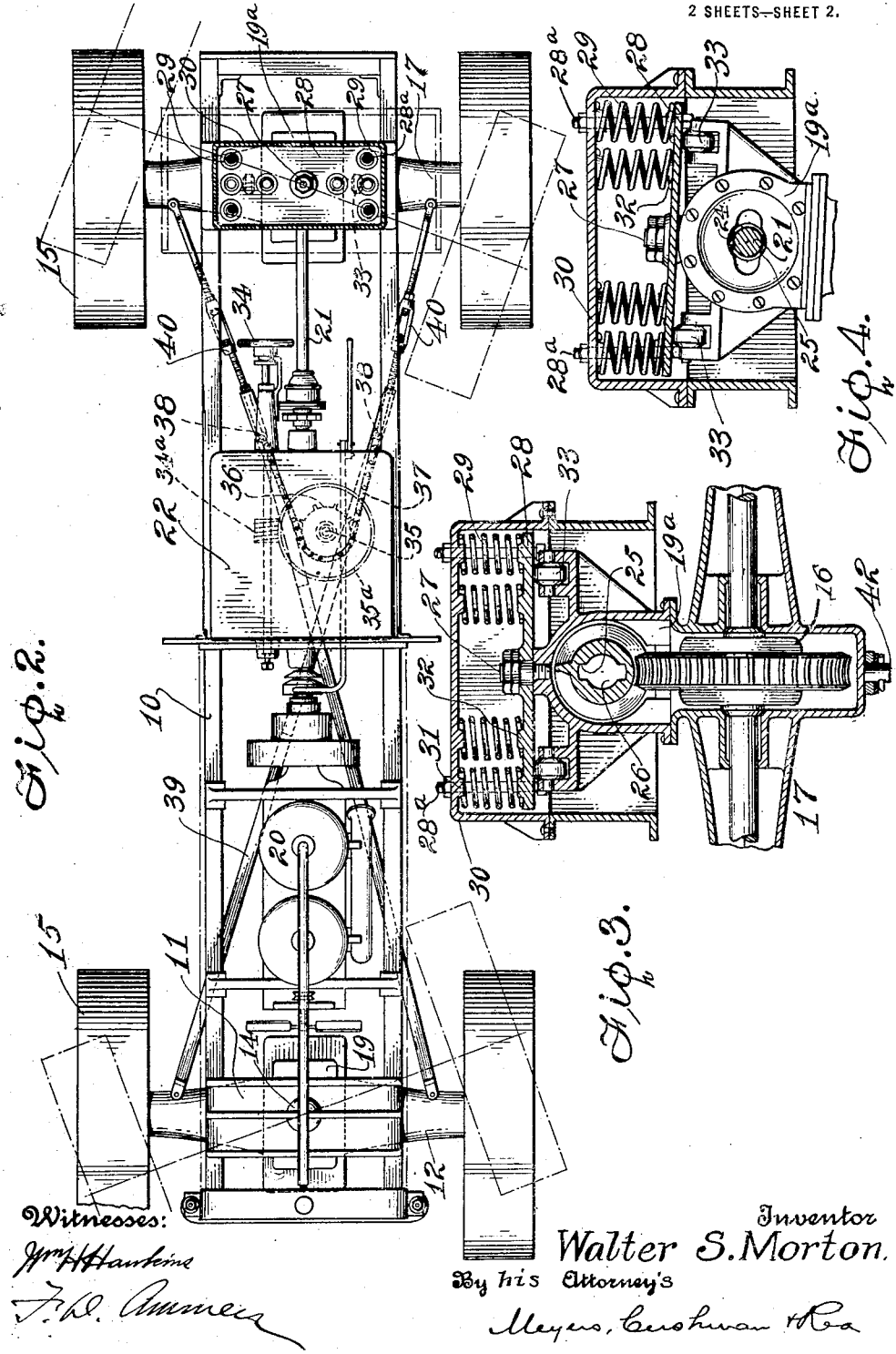
Witnesses:
Inventor
Walter S. Morton.
By his Attorney's

UNITED STATES PATENT OFFICE.

WALTER S. MORTON, OF HARRISBURG, PENNSYLVANIA.

TRACTOR.

1,371,641.

Specification of Letters Patent.  Patented Mar. 15, 1921.

Application filed October 30, 1915. Serial No. 58,827.

*To all whom it may concern:*

Be it known that I, WALTER S. MORTON, a citizen of the United States, residing at Harrisburg, in the county of Dauphin and State of Pennsylvania, have invented new and useful Improvements in Tractors, of which the following is a specification.

My invention relates to vehicles and particularly to those heavy types of vehicles which are adapted to be used as trucks or tractors, and in which the axles may be swung in a front-and-rear direction to steer the vehicle though a driving connection is maintained to all the wheels at all times.

A principal object of the invention is to produce a motor-truck or tractor of this type having improved means for supporting the frame on the axles which will admit of the movements of the axles suggested above, and also to provide means for maintaining an effective driving connection to all of the wheels of the tractor at all times.

A further object of the invention is to provide a tractor of the four-wheel drive type having a novel arrangement of the essential mechanisms of the tractor including the engine, the transmission mechanism and the driver's seat relative to the front and rear axles of the tractor so that a strong, flexible and compact structure is provided which may not only be easily controlled by the operator, but which may be turned within narrow limits.

Further objects of the invention will appear more fully hereinafter.

The invention consists in the general combination of parts and details hereinafter described, all of which contribute to produce an efficient tractor or motor-truck.

A preferred embodiment of the invention is described in the following specification, while the broad scope of the invention is pointed out in the appended claims.

In the drawing,

Figure 1 is a side elevation and partial section of a motor-truck or tractor embodying my invention.

Fig. 2 is a plan of the vehicle shown in Fig. 1.

Fig. 3 is a vertical central section upon an enlarged scale illustrating details of the back axle and means for supporting the frame upon it.

Fig. 4 is a view similar to Fig. 3 but showing only the parts shown in the upper portion of Fig. 3 and particularly indicating the manner in which the rear axle may tip or tilt with relation to the frame.

Fig. 5 is a plan of a locking ring which is a detail of the invention.

In practising my invention, I provide a truck frame 10 of any suitable general construction, preferably comprising at its forward end a heavy cross beam or bolster 11, under which is located the forward axle 12 of the vehicle, and I prefer to provide a joint connection between this axle and the bolster which will give considerable freedom of movement of the axle, namely, a movement in a front-and-rear direction, that is, in a substantially horizontal plane, and another up-and-down movement, or movement in a substantially vertical plane.

In order to accomplish this, I prefer to provide a rounded head or ball 13 which is rigid with the axle 12 and is located above the axle, and this ball is received in a rounded socket 14 which is preferably formed in the under side of the bolster 11. Any suitable means may be provided for imparting rotation to the wheels 15 of the vehicle. In the present instance for example, I have illustrated a differential 16 which is carried in the forward axle 12 and also in the rear axle 17, and each differential is driven by a corresponding driving gear which is preferably in the form of a worm 18, said driving gears or worms being suitably carried in gear cases 19 and 19ª, respectively.

Referring again particularly to the forward axle 12, I prefer to form the rounded head or ball 13 as an integral part of the gear case 19 corresponding to this axle. The worms 18 are preferably driven by means of a suitable motor 20 supported on the frame and which drives the worms directly by driving shafts 21 which extend in opposite directions from a transmission case 22. The drive connection to the worm is preferably a flexible connection which enables the worm to be driven even if the axle corresponding to that worm is out of its normal position. This flexible driving connection preferably comprises a crosshead 23 formed on the end of the driving shaft and which comprises laterally projecting pins carrying rollers 24 which are received in diametrically opposite grooves 25 which extend longitudinally in the wall of the bore 26 of the worm. Evidently, the rotation of the shaft 21 will impart a rotary movement to the worm and at the same time the crosshead 23 may slip inwardly or outwardly in the worm, that is, it has a sliding flexible connection with the worm.

The rear axle 17 is mounted in such a way as to swing in a front-and-rear direction, and also permit an up-and-down or tilting movement with relation to the frame. For this purpose, I prefer to provide a pivotal connection over the axle, preferably comprising a pivot pin 27 which is securely mounted in the upper side of the gear case 19$^a$, and this pin 27 turns loosely in a pivot member 28 which is preferably in the form of an elongated plate extending transversely to the frame of the truck; and I prefer to provide means for guiding this pivot member on the frame in such a way that it will not be rotated when the axle 17 swings in a front-and-rear direction, and this means also operates to prevent a displacement of the frame from the axle by a relative longitudinal movement or a lateral shifting movement. I prefer also to provide yielding means such as springs 29 disposed toward the sides of the frame (see Fig. 3) which rests upon the upper side of the pivot member, and on opposite sides of the pivot 27. The member guiding means is preferably in the form of a housing 30 preferably of box form which is secured to the frame and which is provided with seats or bosses 31 for the springs similar bosses 32 being provided on the plate or pivot member 28. With this arrangement evidently the housing 30 will prevent the plate 28 from rotating when the axle rotates, and at the same time the springs will permit a considerable up-and-down movement or tilting movement of the axle at which time the parts may assume some such relation as that illustrated in Fig. 4. The gear casing 19$^a$ for the rear axle is preferably provided with rollers 33 which roll upon the under side of the pivot member 28 and this reduces the friction of turning.

Any desired number and arrangement of springs 29 may be employed. In the present instance I have illustrated four springs on each side, three of the springs being disposed in a front and rear line near the end of the pivot plate 28. And adjacent each corner of the box or casing 30 I prefer to provide tie bolts 28$^a$ which pass up through the pivot plate 28 and tie it to the top wall of the casing 30. These tie bolts limit the extension of these springs but do not limit their compression. They make the construction more secure and prevent any undue tilting occurring at the pivot plate.

The steering of the tractor may be effected in any suitable manner. In the present instance, this may be accomplished by means of a steering wheel 34 the rotation of which operates to rotate a worm 34$^a$ and wheel 35$^a$ on the vertical spindle 35, see Fig. 1. The lower end of this spindle 35 carries a sprocket wheel 36 carrying a chain 37, the ends of which are anchored at 38 in bifurcations of crossed steering rods 39. These rods 39 are pivotally attached at their ends to the axles and are provided with turnbuckles 40 for adjusting their length.

In order to render the axles more secure, I provide means for securing each axle on its under side, preferably consisting of a brace 41, the outer end of each brace being attached to a pivot 42 on the under side of the axle, and in axial alinement with the joint connection which is formed on the upper side of the axle. The inner end of these braces 41 are attached by a pivotal connection 43 to a bracket plate 44 secured to the under side of the transmission case 22.

Referring again to the forward axle 12, I prefer to provide means for preventing the ball or rounded head 13 from coming out of its socket 14 in case the weight of the frame should be lifted off the forward axle, and for this purpose I prefer to provide a keeper in the form of a split ring or plate 45, see Fig. 5, said plate being applied as indicated in Fig. 1. The opening 46 through this plate is smaller than the diameter of the ball and this, of course, retains the ball in its socket.

In the embodiment of the invention illustrated, I have shown the engine 20 as supported by the truck frame 10 just in rear of the front axle 12 and the transmission mechanism arranged or located adjacent to and slightly in rear of the engine, while the driver's seat is located just in rear of the transmission and substantially over the rear axle of the truck, there being a yieldable support or connection between the rear axle and the driver's seat which is supported by the truck frame 10. This arrangement of the various parts referred to makes a compact organization of the several essential elements of the tractor enabling the whole machine to be brought within substantially narrow longitudinal limits, and as all four wheels are directly connected and positively driven from the motor, and as the axles for all of the wheels are pivoted to swing in horizontal planes for steering purposes, the tractor can be turned within narrow limits. This general construction and arrangement of parts in a tractor, I believe to be new with me, and, as it has decided advantages over the ordinary forms of trucks and tractors wherein the engine is located forward of the front axle, I have based claims thereto.

As will be understood, each axle has a joint connection with the frame so as to permit individual relative movements between frame and axles pivotally in approximately horizontal and vertical planes, producing the four-wheel drive action desired. In addition, the rear axle has a yielding bodily movement relative to the frame without affecting the pivotal action referred to. This arrangement not only is of material advantage in connection with movements of the tractor over rough surfaces, but the particular arrangement shown, in which these joint connections are located mainly above the bottom plane of the frame, provides additional advantage in that the frame is located comparatively close to the axles and thus places the load comparatively low. By lowering the load weight in this manner, the stability of the tractor under rough usage is materially increased since there is less likelihood of the tractor being upset under these conditions. As shown in Fig. 1 this places a part of the joint connection above the top plane of the frame, and by locating the seat at the point indicated, the seat tends to protect the housing against damage as well as form a guard to prevent tripping of the driver in moving about.

It is understood that the embodiment of the invention set forth herein is only one of the many embodiments or forms the invention may take, and I do not wish to be limited in the practice of the invention nor in my claims to the particular embodiment set forth. And I may use any feature of my invention without the other features.

What I claim is:

1. In a tractor, in combination, a frame, an axle having a joint connection with said frame permitting a swinging movement of said axle in a front-and-rear direction in steering the tractor and permitting a swinging movement of said axle on said frame in a substantially vertical plane, another axle, a pivot member having a pivotal connection with said second named axle and extending transversely of the tractor, a housing attached to said frame receiving and guiding said pivot member, springs resting on said pivot member and thrusting against said housing to support said frame on said pivot member and permitting an up-and-down and tilting movement of said pivot member in said housing, rollers carried by said second named axle and rolling on the under side of said pivot member, said pivotal connection and said rollers permitting a swinging movement of said second named axle in a front-and-rear direction, wheels on said axles, a differential on each axle for driving said wheels, a driving gear at each axle for driving each differential, a motor on said frame, and means for driving said driving gears from said motor.

2. In a tractor, in combination, a frame, an axle, wheels on said axle, a differential carried by said axle for driving said wheels, a driving gear over said axle for actuating said differential, a case for said driving gear having a rounded head on the upper side thereof, a frame having a rounded socket receiving said head, said head and socket permitting a swinging movement of said axle in a front-and-rear direction in steering the tractor and permitting a movement of said axle relatively to said frame in a substantially vertical plane, a second axle, a pivot member having a pivotal connection with the said second named axle and supported thereby, said pivot member extending transversely of the tractor, a housing receiving said pivot member preventing the rotation thereof with said second named axle, springs resting on said pivot member and thrusting upwardly against said housing to support said frame on said pivot member, rollers carried by said second named axle and rolling on the under side of said pivot member, said pivotal connection and said rollers permitting a swinging movement of said second named axle in a front-and-rear direction, said springs permitting an up-and-down and tilting movement of said second named axle relatively to the frame in a substantially vertical plane, wheels on said axles, a differential on said second named axle, a driving gear for the same, wheels on said axles, a motor supported on said frame, and means for driving said driving gears from said motor.

3. In a tractor, in combination, a frame, an axle having a joint connection with said frame, permitting a swinging movement of said axle in a front-and-rear direction in steering the tractor and permitting a swinging movement of said axle on said frame in a substantially vertical plane, another axle, a pivot member in the form of an elongated plate extending transversely of the tractor, a housing carried by the frame receiving and guiding said pivot member to prevent the rotation thereof with said second named axle, springs within said housing resting on said pivot member toward the sides of the tractor and yieldingly supporting the frame thereupon, said springs permitting an up-and-down and tilting movement of said pivot member within said housing, said pivotal connection permitting a swinging movement of said second named axle in a front-and-rear direction, a differential corresponding to each axle, a driving gear corresponding to each differential, a motor carried by said frame, and means for actuating said driving gears from said motor.

4. In a tractor and in combination, a frame, a pair of axles each having a joint connection with the frame to permit individual swinging movements of the axles bodily on approximately horizontal and vertical planes relative to the frame, a drive gear for each axle, a motor, and drive connections between the motor and said drive gears, said joint connections being located above the bottom plane of the frame.

5. In a tractor and in combination, a frame, a pair of axles, one of said axles having a ball and socket connection with the frame to permit pivotal movements of the axle in approximately horizontal and vertical planes, a motor, drive means connecting the motor with each axle to permit individual driving of the several axle wheels, and means for connecting the frame and the other axle to permit pivotal movements of the axle relative to the frame on approximately horizontal and vertical planes and permit relative yielding movement between the axle and frame.

6. In a tractor and in combination, a frame, a pair of axles, one of said axles having a ball and socket connection with the frame to permit pivotal movements of the axle in approximately horizontal and vertical planes, a motor, drive means connecting the motor with each axle to permit individual driving of the several axle wheels, and means for connecting the frame and the other axle to permit pivotal movements of the axle, relative to the frame on approximately horizontal and vertical planes and permit relative yielding movements between the axle and frame, said ball and socket connection and said means being mainly located above the bottom plane of the frame.

In testimony whereof I have hereunto set my hand in presence of two subscribing witnesses.

WALTER S. MORTON.

Witnesses:
A. C. WHALEN,
ROBT. L. MORTON.